United States Patent [19]
Bielak et al.

[11] Patent Number: 5,593,256
[45] Date of Patent: Jan. 14, 1997

[54] ELIMINATING HINGED DRILL CAPS

[75] Inventors: Charles R. Bielak, Plymouth; Richard J. Furness, Ann Arbor, both of Mich.

[73] Assignee: Ford Motor Company, Dearborn, Mich.

[21] Appl. No.: 498,208

[22] Filed: Jul. 5, 1995

[51] Int. Cl.$^6$ .................................................. B23B 35/00
[52] U.S. Cl. ........................... 408/1 R; 408/61; 408/67
[58] Field of Search ........................ 408/1 R, 56, 61, 408/67, 68

[56] References Cited

U.S. PATENT DOCUMENTS

| | | |
|---|---|---|
| 1,448,507 | 3/1923 | Stueber . |
| 2,154,793 | 4/1939 | Weber . |
| 2,272,271 | 2/1942 | Mallory . |
| 2,989,046 | 6/1961 | Zimmerman . |
| 3,781,124 | 12/1973 | Bodycomb . |
| 5,148,728 | 9/1992 | Mazurkiewicz . |

FOREIGN PATENT DOCUMENTS

| | | | |
|---|---|---|---|
| 57-184612 | 11/1982 | Japan | 408/1 R |
| 6-6106407 | 4/1994 | Japan | 408/1 R |

*Primary Examiner*—Steven C. Bishop
*Attorney, Agent, or Firm*—Joseph W. Malleck; Roger L. May

[57] ABSTRACT

A method of through-hole drilling of metal workpieces having sufficient ductility to create hinged drill caps, which comprises: while carrying out through-hole drilling with low thrust drill tips, directing a fluid jet stream against the drill exit side of the workpiece with sufficient force to retain and resulting drill cap closed against the exit side until such drill cap is completely annularly severed from the workpiece, the jet stream being oriented substantially coincident with the revolving axis of the drill. The fluid of the jet stream may be a machining liquid coolant, a gas, or a water-based solution. The jet stream has a diameter upon impingement with the workpiece that is less than the diameter of the exit opening created by the drill.

7 Claims, 3 Drawing Sheets

ELIMINATING HINGED DRILL CAPS

BACKGROUND OF THE INVENTION

1. Technical Field

This invention relates to the technology for eliminating hinged drill caps resulting from through-hole drilling of at least moderately ductile metals, and particularly to technology that eliminates drill caps resulting from using drill bits with reduced width chisel edges or split points.

2. Discussion of the Prior Art

When using reduced width chisel edged drills or split point drills for through-hole drilling (drilling through the entire depth of the workpiece) in ductile steels, drill caps are commonly formed as the drill exits the workpiece. Drill caps are thin sections of material, resembling the shape of the drill point, which are extruded rather than cut during the drilling process. Drill caps form as the thrust force in drilling overcomes the material's resistance to axial plastic flow. The thickness of the drill cap is a function of the drilling feed, and is typically in the range of 0.003–0.006 inches. As the drill exits the workpiece, the drill cap begins to break free from the workpiece around part of the perimeter of the hole at one side thereof, and then folds over and hinges along an edge of the drilled hole at the other part of the perimeter.

Drill caps can be a problem for many powertrain drilling operations of automotive powertrain components, such as clutch plate bearing sleeves in automatic transmissions, requiring very small drill openings for lubrication purposes. Split point style drills are often used in production drilling operations. Using such drill design, when drilling steel components, frequently leads to the formation of drill caps which remain attached to the part. Drill cap formation itself is not a concern, but the retention on the part can be a severe problem. They are difficult to remove with automated deburring equipment. Automated deburring may involve: blowing of abrasive grit to knock off the drill caps, such method being relatively by expensive; wire brushing which more frequently tends to push the drill cap back up into the hole, closing such hole; or electrolytic erosion by immersing the workpiece in a bath which often allows an electric arc to occur between the surface of the workpiece and the hinged cap thereby avoiding cap removal.

If the drill caps are not removed they can adversely affect subsequent machining (such as damage flow honing tool), affect subsequent hardening (material handling equipment having difficulty of inserting folders into the workpiece with the presence of hinged drill caps), or assembly processes. If drill caps are present after final assembly, their presence during system operation (such as in a transmission or in an engine) may lead to improper performance or warranty repair.

Published prior art has not solved the problem of hinged drill caps. Drilled workpieces have been bathed or flushed with a cooling medium for loose chip removal, or subjected to a suction to pick up loose debris; these techniques do not avoid the formation of hinged drill caps. Coolant jets have been directed at the shear edge cutting zone in some drilling operations, but this also fails to prevent hinged drill caps.

SUMMARY OF THE INVENTION

An object of this invention is to economically prevent the formation of hinged drill caps thereby increasing the life of the drilling tool, protecting the workpiece against thermal damage, and avoiding any mishandling by automatic or robotized equipment due to problems associated with parts containing hinged drill caps.

The invention is a method of through-hole drilling of metal workpieces having sufficient ductility to create hinged drill caps, comprising: while carrying out through-hole drilling with low thrust drill tips, directing a fluid jet stream against the drill exit side of the workpiece with sufficient force to retain any resulting drill cap closed against the exit side until such drill cap is completely annularly severed from the workpiece, the jet stream being oriented substantially coincident with the revolving axis of the drill.

The fluid of the jet stream may be a machining liquid coolant, a gas, or a water-based solution. The jet stream will have a diameter upon impingement with the workpiece that is less than the diameter of the exit opening created by the drill. Such jet stream may have a force that is at least equal to the break through thrust force of the drill bit, but such force is a function of drill diameter, workpiece material properties, and machining feed.

DETAILED DESCRIPTION AND BEST MODE

Figure 1:
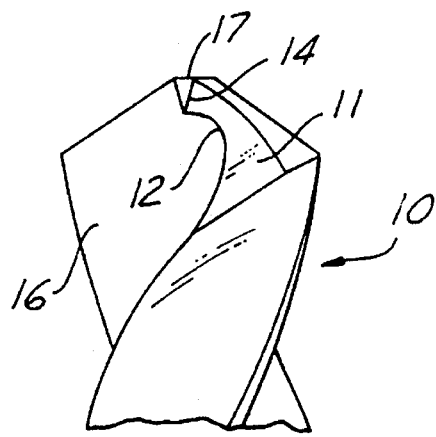
FIGS. 1 and 2 are respectively an elevational view and a plan view of a split point twist drill illustrating the contours of such drill bits that lead to the problem solved by this invention.
Figure 2:
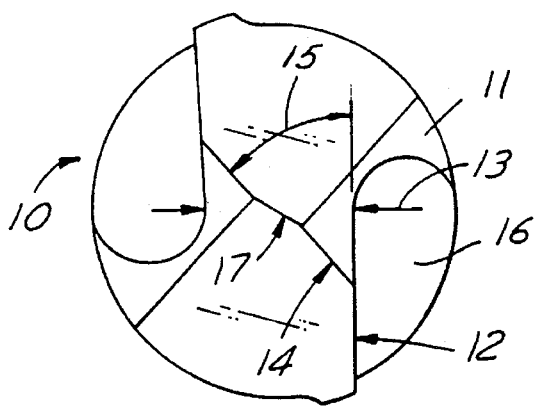

FIGS. 1 and 2 illustrate the character of a split point twist drill bit 10. This type of point, also called a crankshaft point, was originally developed for use on drills designed for producing small-diameter, deep holes in automotive crankshafts. But since then such drill bits have gained wide spread use for drilling a wide variety of hard and soft materials. Heavy duty types with thicker webs are used for drilling stainless steels, titanium, tough alloys and higher temperature resistant alloys.

In generating split points on drills, the clearance face 11 of each cutting edge 12 is given a sharp (about 55° typical) secondary relief 13 to the center of the chisel edge, thus creating a secondary cutting lip 14 on the opposite cutting edge. The angle 15 between these lip segments act as a chipbreaker when drilling is done on many materials, producing smaller chips that are readily ejected through the flutes 16. More importantly, however, the additional cutting edges produced and the reduction in width of the original chisel edge 17 reduces thrust requirements (typically reduced by about 25–30% compared to conventional 118° points) and thereby improves the centering capability of the drill point.

As shown in FIGS. 3–7, using such a split point 10 to drill a hole 40 in a ductile workpiece 20 without the use of this invention, shows that the drill 21 will enter the workpiece (FIGS. 3 and 4) and as it begins to push out (see FIG. 5) of the opposite side 22 of the workpiece, not only will an annular ridge 23 or burr be formed, but the drill cap 24 itself, being a thin section of material resembling the shape of the drill point, is extruded rather than cut during the process. The drill cap 24 is formed as the thrust force of drilling overcomes the material's resistance to axial plastic flow. The drill cap begins to break free on one side (see FIG. 5) from the workpiece along the periphery of the hole and then folds over and hinges along on opposite edge 41 of the drill (see FIG. 6) and remains attached thereto at the pushout burr after removal of the drill (see FIG. 7).

In accordance with this invention, and as shown in FIGS. 8–12, a fluid jet stream 30 (preferably comprised of the coolant normally used to bathe the drilling operation) is directed at the exit area 31 of the drilling location or pattern 32. The jet stream 30 is formed to have a force that is applied to such exit side that will retain any cap 34, that is formed, closed against the exit side 33 until the cap 34 is completely annularly severed from the workpiece 35, leaving only the annular push out burr 45. To do this the jet stream 30 must be directed parallel and coincident with the revolving axis 36 of the drill as it is being thrust through the workpiece.

The jet stream 30 has a diameter 37 less than the diameter 38 of the exit opening 39 created by the drill point 10. The jet stream may be produced by a nozzle 42 having an orifice size 43 in the range of 0.01 to 0.20 inches, and spaced from the workpiece a distance about 0.25 to 0.50 inches. For example, for a drill bit having a diameter of about 157 inches and the workpiece being constituted of AISI 1020 hotroll steel, the jet stream 30 was applied against the workpiece exit side 33 with a force of about 100 psi as generated through a stream orifice having a size of about 0.060 inches diameter. The orifice was located 0.5" from the exit surface and the fluid stream was importantly axially aligned with the drill. These operating parameters resulted in approximately a two pound force on the workpiece due to the fluid stream. This approach has worked successfully with the exit side jet stream use for drills having diameters ranging from 125 inches–0.375 inches, although diameters larger will require greater forces to retain the cap. This could be accomplished by suitable modifications to either the (1) orifice size, (2) spacing distance, or (3) fluid pressure.

Figure 5:
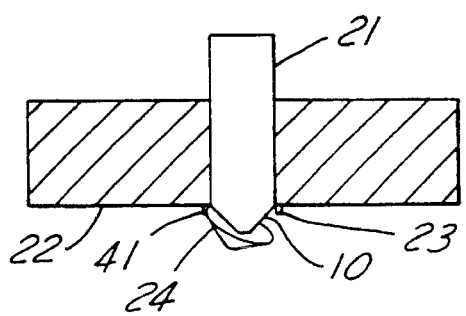
Figure 6:
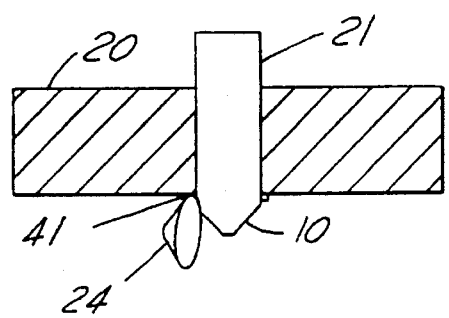
Figure 7:
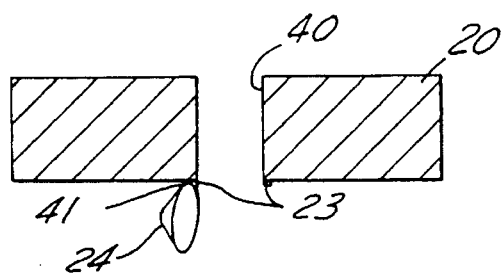
Figure 8:
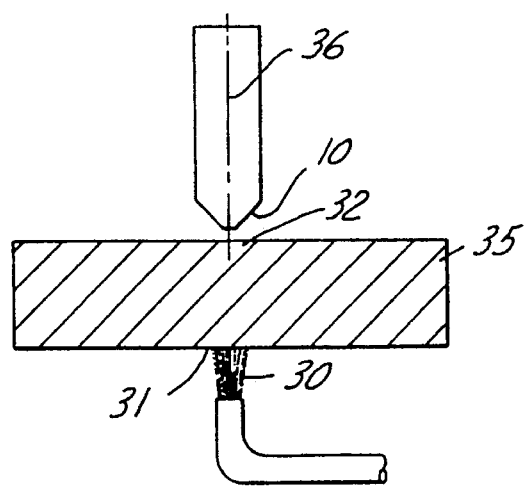
FIGS. 8–12 are a series of schematic illustrations showing the use of split point drill bits in carrying out drilling according to this invention and illustrating the total removal of drill caps as a result thereof.
Figure 9:
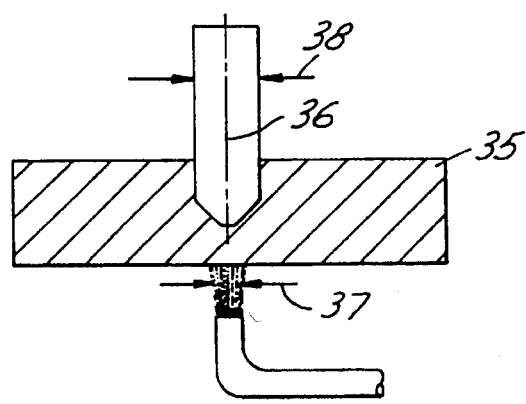
Figure 10:
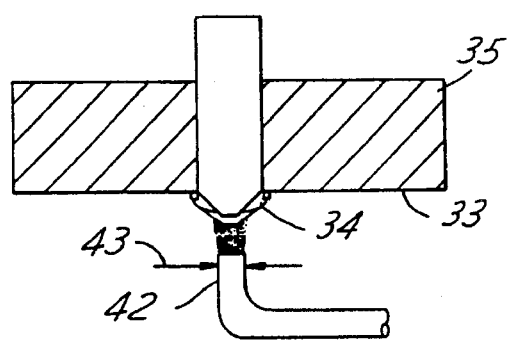
Figure 11:
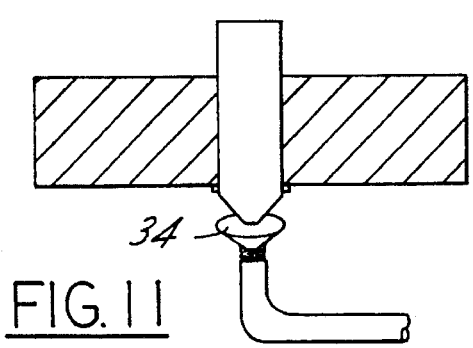
Figure 12:
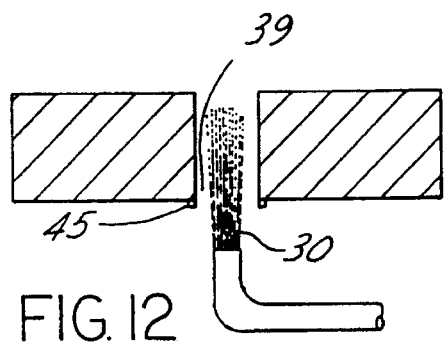

More importantly, the jet stream must generate sufficient force to prevent the cap from hinging and remaining attached to the workpiece (this "hinging" process is illustrated in FIGS. 5–7). Orifice size, spacing, and pressure are all independent variables which affect this force. An infinite range of values is possible, however engineering judgment must be employed for judicious selection. Choice of orifice size above was based on considerations of fluid volume flow rate. The spacing of the orifice from the workpiece was based on convenience for setup. The fluid pressure was then calculated based on the anticipated required force (as approximated from the data in FIGS. 13 and 14). Fluid properties (namely density) must be considered when determining appropriate values for these variables.

Figure 13:
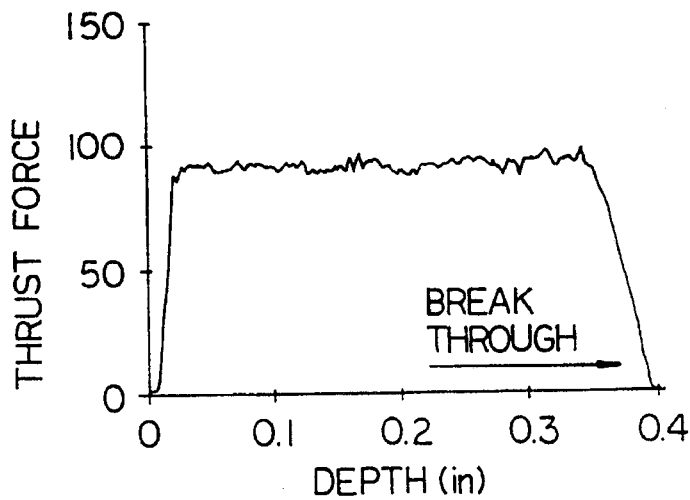
FIGS. 13 and 14 are respectively graphical illustrations showing thrust force profile as a function of feed level, FIG. 13 being for a high feed level rate and FIG. 14 being for a low feed level rate.
Figure 14:
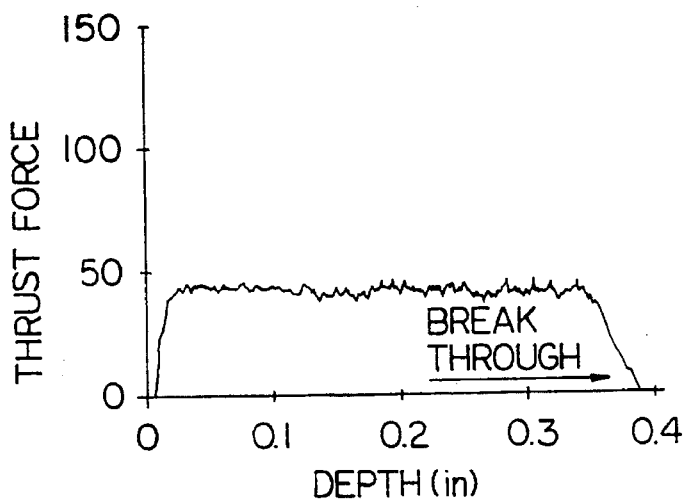
Figure 3:
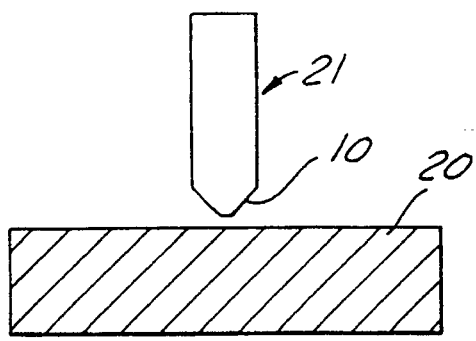
FIGS. 3–7 are a series of schematic illustrations showing the cycle of drilling using a split point drill bit for drilling a steel workpiece according to existing technology showing the formation of hinged drill caps consistent with to the state of the art.
Figure 4:
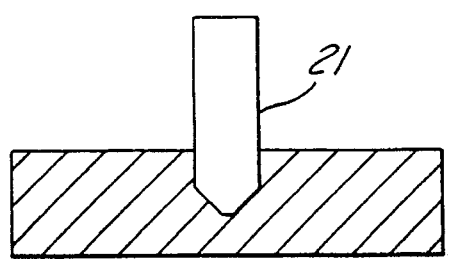

It has been found for purposes of the jet stream to operate to keep the hinged drill cap closed until such time as the drill has fully penetrated through the workpiece, the jet force should have a force at least equal to the break-through force of the drill, and this is generally in the range of 2–15 pounds. The drill caps will generally have a thickness in the range of 0.003–0.006 inches. The particular force range is a function of drill diameter, workpiece material properties, and machining feed. The cited range refers to an example using a 0.157" diameter drill in AISI 1020 hot rolled steel. FIGS. 13 and 14 contain force measurements while drilling with feed levels of 0.003 and 0.006 inches per revolution, respectively. These feed values are representative of conventional practice for this drill diameter and workpiece material. The force values as the drill breaks through the exit side of the workpiece are indicated on these figures. The drill cap formation phenomenon is most frequently encountered when drilling ductile steels (i.e., not hard or brittle) or aluminum. Drill cap formation has been reported by others for stainless steels and many other exotic materials used in the aircraft industry.

The jet steam may be constituted of a variety of fluids such as machining coolant normally used to carry out the drilling operation the fluid must have sufficient fluidity to concentrate the force needed. A gas can be used, or even a water-based solution specifically designed for this use. The jet stream may be pulsed during drilling so that it need be on only continuously as the drill bit penetrates through the exit side of the workpiece. The Workpiece itself must be of a metal that has sufficient ductility to create drill caps. The typically results when using low to medium carbon plain or alloy steels (e.g., 1018, 4340, etc.). This phenomenon (drill cap formation when using split-point drills) is primarily due to material ductility. The material hardness level at which caps cease to form has not been determined. This problem does not occur in brittle materials, such as cast iron.

As shown in FIG. 13, the drill used in the example above, when applied at a high feed level, had a thrust force profile with a breakthrough substantially the same as when applied at a low feed level (FIG. 14).

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of through-hole drilling of metal workpieces having sufficient ductility to create hinged drill caps, comprising: while carrying out through-drilling with low thrust drill tips, directing a fluid jet stream against the drill exit side of the workpiece with sufficient force to retain the cap closed against the exit side of the workpiece until the cap is completely annularly severed from the workpiece, said jet stream being oriented to be substantially coincident with the revolving axis of the drill.

2. The method as in claim 1, in which said drill tip is constructed to have a split point.

3. The method as in claim 1, in which said jet stream has a diameter less than the exit opening diameter created by said drill, the jet stream being produced by a nozzle having an orifice size and spacing of the orifice from the workpiece sufficient to prevent the cap from hinging.

4. The method as in claim 1, in which said jet stream has a thrust force in the range of 2 to 15 pounds when using a drill having a diameter of 0.150–0.165 inches and the workpiece is hot rolled carbon steel.

5. The method as in claim 1, in which said jet stream is pulsed during drilling so that it need be on continuously only as the drill bit penetrates through the exit side of the workpiece.

6. The method as in claim 1, in which said jet stream is a fluid selected from the group consisting of machining coolant, gas, and water-based solution.

7. The method as in claim 1, in which said workpiece is constituted of a metal selected from the group consisting of ductile steel and aluminum.

* * * * *